(12) United States Patent
Hirata et al.

(10) Patent No.: US 12,216,278 B2
(45) Date of Patent: Feb. 4, 2025

(54) LIGHT SOURCE DEVICE AND ELECTRONIC DEVICE

(71) Applicant: MAXELL, LTD., Kyoto (JP)

(72) Inventors: Koji Hirata, Kyoto (JP); Toshinori Sugiyama, Kyoto (JP); Yasuhiko Kunii, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/745,119

(22) Filed: Jun. 17, 2024

(65) Prior Publication Data

US 2024/0337836 A1    Oct. 10, 2024

Related U.S. Application Data

(63) Continuation of application No. 18/284,568, filed as application No. PCT/JP2022/006270 on Feb. 16, 2022, now Pat. No. 12,050,317.

(30) Foreign Application Priority Data

Mar. 29, 2021    (JP) ................. 2021-055038

(51) Int. Cl.
  *G02B 5/26*    (2006.01)
  *B60K 35/23*    (2024.01)
  (Continued)

(52) U.S. Cl.
  CPC .......... *G02B 27/0101* (2013.01); *B60K 35/23* (2024.01); *F21S 2/00* (2013.01);
  (Continued)

(58) Field of Classification Search
  CPC .......... G02B 5/26; G02B 27/0101; F21V 9/32
  (Continued)

(56) References Cited

U.S. PATENT DOCUMENTS 9,880,453 B2    1/2018  Huang
10,082,731 B2    9/2018  Kawasumi
(Continued)

FOREIGN PATENT DOCUMENTS

JP    11-224518 A    8/1999
JP    2017-188298 A    10/2017

OTHER PUBLICATIONS

International Search Report of PCT/JP2022/006270 dated Apr. 5, 2022.

*Primary Examiner* — Christopher M Raabe
(74) *Attorney, Agent, or Firm* — Mattingly & Malur, PC

(57) ABSTRACT

A light source device which is miniaturized, can be manufactured at low cost, and is suitable as an illumination light source of a display device of an electronic device such as an HUD and an aerial floating image display apparatus is provided. The light source device includes: a light source configured to generate white light by irradiating a phosphor with light emitted from a solid-state light source; a collimating optical system (15) configured to convert a divergent light flux of the white light emitted from the light source into parallel light; a light guide configured to cause the light emitted from the collimating optical system (15) to be incident as incident light and emit the incident light in a direction different from an incident direction; and a filter configured to reflect light in a blue region of the parallel light to irradiate the phosphor.

14 Claims, 17 Drawing Sheets

(51) Int. Cl.
*F21S 2/00* (2016.01)
*F21V 9/32* (2018.01)
*G02B 5/30* (2006.01)
*G02B 19/00* (2006.01)
*G02B 27/01* (2006.01)

(52) U.S. Cl.
CPC .............. *F21V 9/32* (2018.02); *G02B 5/26* (2013.01); *G02B 5/3066* (2013.01); *G02B 19/0061* (2013.01)

(58) Field of Classification Search
USPC ........................................................ 362/84
See application file for complete search history.

(56) References Cited

U.S. PATENT DOCUMENTS

| 10,976,651 | B2 | 4/2021 | Kashihara | |
|---|---|---|---|---|
| 2017/0293211 | A1* | 10/2017 | Kobayashi | ............. G03B 21/16 |
| 2019/0113672 | A1 | 4/2019 | Sugiyama et al. | |
| 2020/0011506 | A1 | 1/2020 | Mao et al. | |

* cited by examiner $\beta 1 = \beta 2 = \beta 3 = \beta 4 = \cdots = \beta 122 = \cdots \beta 130$

COMPARATIVE EXAMPLE

LIGHT SOURCE DEVICE AND ELECTRONIC DEVICE

TECHNICAL FIELD

The present invention relates to a light source device which can be used as a planar light source, and particularly, to a planar light source device which is suitable for use in an electronic device including an image display device aiming at miniaturization.

BACKGROUND

As an illumination light source for a display device of a head-up display (hereinafter referred to as "HUD") or an ultra-small projector, a light source device which is miniaturized and has high efficiency is desired.

Note that conventionally known by the following Patent Document 1 is a light source device using a light guide in which a predetermined texture is formed on a transparent resin in order to realize a miniaturized and highly efficient light source device. In the light guide illumination device described in this patent document, it is described that a thin high-efficiency light source device can be realized by making light incident from an end portion of the light guide and scattering the incident light by a texture formed on a surface of the light guide.

RELATED ART DOCUMENTS

Patent Documents

Patent Document 1: Japanese Unexamined Patent Application Publication No. H11-224518 A

SUMMARY

Problems to be Solved by the Invention

In recent years, it has been effective to use an LED as a light emitting source of a light source device along with improvement in light emission efficiency of the LED which is a solid-state light source. However, in an optical system using an LED and an LED collimator for converting light from the LED into substantially parallel light, it has been found that the shape of the optical system disclosed in Patent Document 1 is still insufficient in terms of light utilization efficiency characteristics and uniform illumination characteristics.

Therefore, it is specifically an object of the present invention to provide a light source device which achieves miniaturization of the light source device by further improving light utilization efficiency characteristics and uniform illumination characteristics of laser light from an LED light source, which can be manufactured at low cost, and which is therefore suitable as an illumination light source in a display device of an electronic device such as an HUD or an aerial floating image display apparatus, and to further provide an electronic device including an image display device using the light source device.

Means for Solving the Problem

As an embodiment for achieving the above purpose, there is provided a light source device including: a collimating optical system configured to, by using a high-luminance light emitting diode (LED) as a solid-state light source, convert light emitted from the solid-state light source into substantially parallel light; and a light guide configured to cause the light emitted from the collimating optical system to be incident and emit the light in a direction different from an incident direction. A reflective film is provided so as to have an optical characteristic of reflecting a part of blue light and ultraviolet light to the LED side on any one of an optical element constituting the collimating optical system and an optical element provided between the collimating optical system and the light guide. A polarization conversion element is provided to reflect a part of light emitted from the LED to the LED side by an action of the reflective film, to align and a polarization direction of light emitted from the light guide in one direction. According to the present invention, the electronic device using the above-described light source device as an image display device includes an HUD and an aerial floating image display apparatus.

EFFECTS OF THE INVENTION

According to the present invention described above, it is possible to realize a light source device that can be manufactured at low cost and that is miniaturized, highly efficient, and highly reliable.

BRIEF DESCRIPTIONS OF THE DRAWINGS

DETAILED DESCRIPTION

In the following, embodiments of the present invention will be described in detail with reference to the drawings.

First Embodiment

Figure 1:
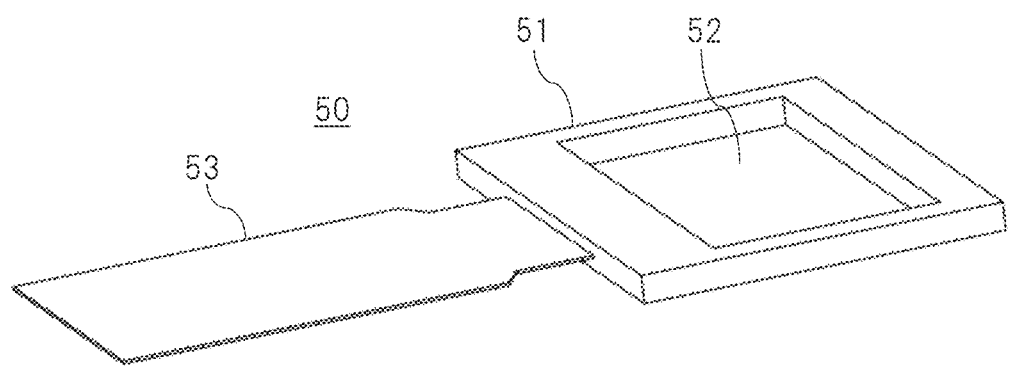
FIG. 1 is an exploded perspective view illustrating an overall overview of a light source device according to a first embodiment of the present invention.

FIG. 1 is an exploded perspective view illustrating an overview of a light source device according to a first embodiment of the present invention. As is also apparent from the drawing, a light source device (main body) 10 is formed of, for example, plastic or the like, and is constituted of a light source device case 11 formed by housing an LED, a collimator, a synthetic diffusion block (diffusion block), a light guide, and the like, which will also be described in detail below, inside the light source device. A liquid crystal display element 50 is attached to the upper surface of the light source device, an LED substrate 12 on which a light emitting diode (LED) element which is a semiconductor light source and a control circuit thereof are mounted is attached to one side surface of the light source device, and a heatsink 13 for cooling heat generated in the above-described LED element and control circuit is attached to the outer side surface of the LED substrate 12.

Further, the liquid crystal display element 50 attached to the upper surface of the light source device case 11 is constituted of a liquid crystal display panel frame 51, a liquid crystal display panel 52 attached to the frame, and a flexible printed circuit board (FPC) 53 electrically connected to the panel. In other words, as will also be described in detail below, the liquid crystal display panel 52 is controlled by a control signal from a control circuit (not illustrated) constituting the electronic device.

Figure 2:
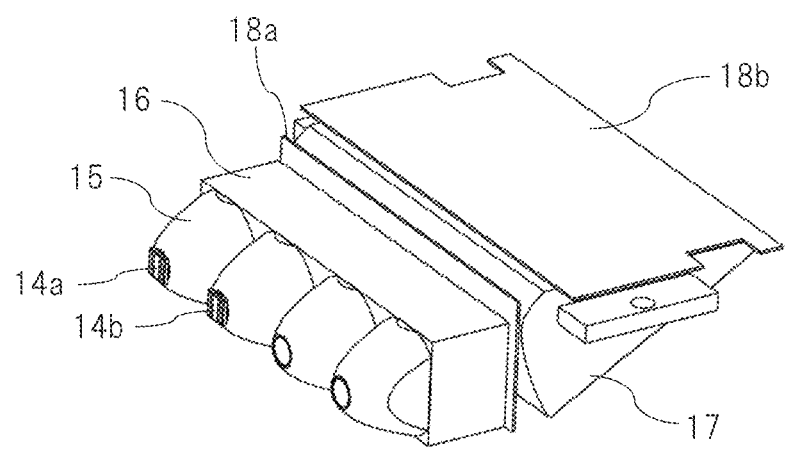
FIG. 2 is a perspective view illustrating an overview of an internal configuration of an optical system in the light source device according to the first embodiment of the present invention.

FIG. 2 illustrates a configuration of an optical system housed inside the light source device 10 described above, that is, in the light source device case 11.

A plurality of (four in this example) LEDs 14a to 14d (only two LEDs 14a and 14b are illustrated in FIG. 2) constituting the light sources are attached to a bottom of each of the LED collimators 15 having a conical convex outer shape obtained by rotating a substantially parabolic disconnection line, and a rectangular synthetic diffusion block 16 is provided on a light emission side of the LED collimators. In other words, the laser light emitted from the LED 14a or 14b is reflected by a boundary surface of the parabolic line of the LED collimator 15, is converted into parallel light, and is incident on the synthetic diffusion block 16.

Further, a rod-shaped light guide 17 having a substantially triangular cross section is provided on an emission surface side of the synthetic diffusion block 16 described above via a first diffusion plate 18a, and a second diffusion plate 18b is attached to the upper surface of the light guide. Thus, horizontal light of the LED collimator 15 described above is reflected upward in the drawing by an action of the light guide 17, and is guided to an incidence surface of the liquid crystal display element 50 described above. Note that, at this point, intensity of the light is uniformized by the first and second diffusion plates 18a and 18b described above.

Usability of High-Luminance LED Light Source

Figure 21:
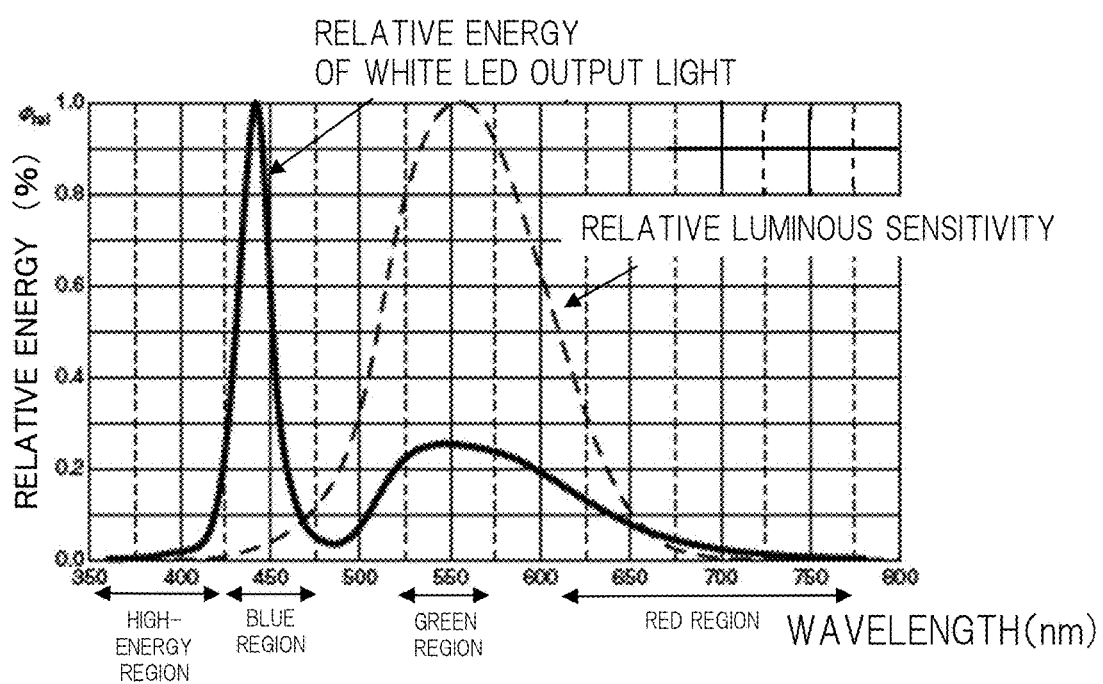
FIG. 21 is a characteristic diagram relatively illustrating radiant energy intensity for each wavelength according to a first embodiment of a high-luminance LED light source.

In the present embodiment, a high-output type LED light source is used as the LED light source, and a basic configuration thereof is a configuration in which a phosphor is excited by a blue LED, and a blue excitation light and fluorescent light (including a green component and a red component) are mixed and diverged. FIG. 21 is a characteristic diagram illustrating spectral radiant energy of a high-luminance LED for an HUD backlight, which is a Product X of Company A, as a relative value. A radiant light flux of 224 to 355 (lm) is output at an input current of 1000 (mA). The high-luminance blue LED for exciting a phosphor containing a green component and a red component as output light has a peak wavelength of 440 (nm), a wavelength of 420 (nm) on a short-wavelength side at which luminance is 10% of a peak luminance, and a cutoff wavelength of 360 (nm), and is such that light belonging to a blue short-wavelength region (indicated as a high-energy region in the drawing) from a high-energy ultraviolet region is diverged. Other high-luminance LEDs for backlight include, for example, a Product Y of Company B. FIG. 23 illustrates a characteristic in which spectral radiant energy is used as a relative value. A light flux of 168 (lm) is output at an input current of 650 (mA). The high-luminance blue LED for exciting a phosphor containing a green component and a red component as output light has a peak wavelength of 445 (nm), a wavelength of 423 (nm) on the short-wavelength side at which the luminance is 10% of the peak luminance, and the cutoff wavelength of 400 (nm). Divergence characteristics of a light source light from the high-luminance LED for the HUD backlight in FIG. 21 are as illustrated in FIG. 22.

Figure 25:
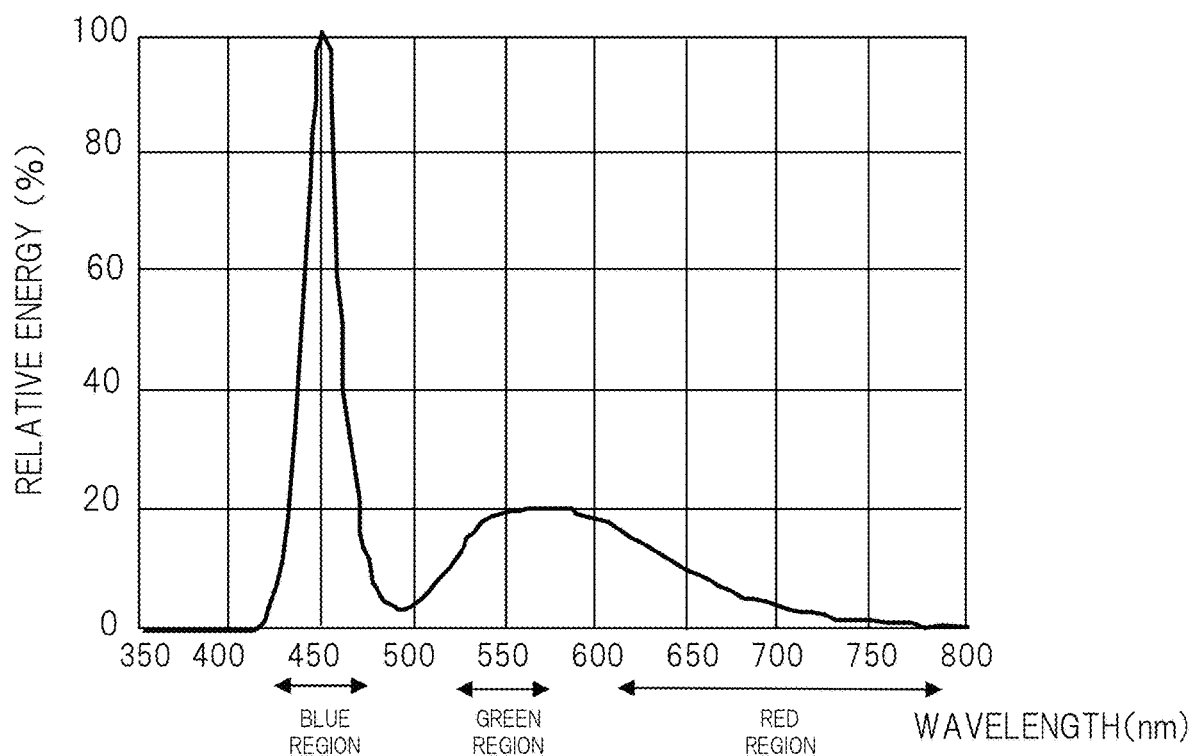
FIG. 25 is a characteristic diagram relatively illustrating radiant energy intensity for each wavelength of an LED light source for an LCD-TV application.

On the other hand, an LED as a representative example used as a backlight light source for a liquid crystal TV includes, for example, a Product Z of Company B. FIG. 25 illustrates a characteristic in which the spectral radiant energy is used as a relative value. A light flux of 168 (lm) is output at an input current of 650 (mA). The high-luminance blue LED for exciting a phosphor containing a green component and a red component as output light has a peak wavelength of 450 (nm), a wavelength of 430 (nm) on the short-wavelength side at which the luminance is 10% of the peak luminance, and the cutoff wavelength of 420 (nm), and has characteristics in which the peak wavelength and cutoff wavelength of the high-luminance LED are shifted to a long-wavelength side.

Figure 27:
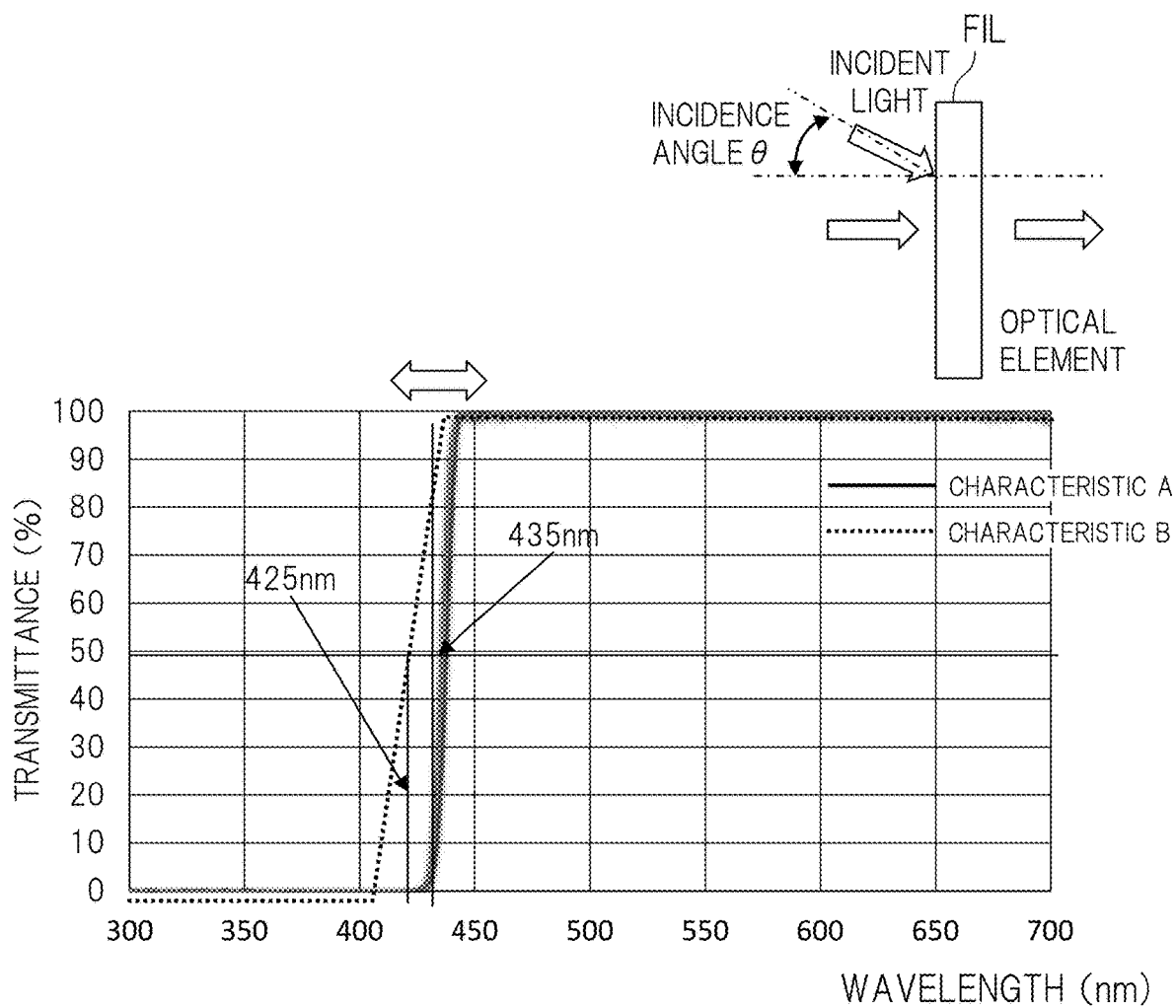
FIG. 27 is a characteristic diagram illustrating spectral transmittance of a filter according to the embodiments.

Therefore, in the light source device using the high-luminance LED, it is necessary to limit the amount of blue light (light in the blue region) having high energy which is incident on a liquid crystal panel and a polarizing plate. Therefore, in the present embodiment, for example, an optical filter FIL having transmission characteristics illustrated in FIG. 27 is disposed between the LED as the light source and an LCD and the polarizing plate as the image source. The filter having a characteristic A obtained by sputtering the metal multilayer film illustrated in FIG. 27 and the filter having a characteristic B obtained by vapor deposition may be provided on a light source light (parallel light) passing surface of an optical element. The filter having the characteristic A is provided at a location closer to an LED as a light source, and light in the high-energy region is completely shielded by the filter having the characteristic A. In addition, it is more preferable that the filter having the characteristic B is provided on a light source light passing surface of a different optical element. In order to obtain the filter characteristics described above, it is essential that the light source light is perpendicularly incident on a filter installation surface.

Figure 22:
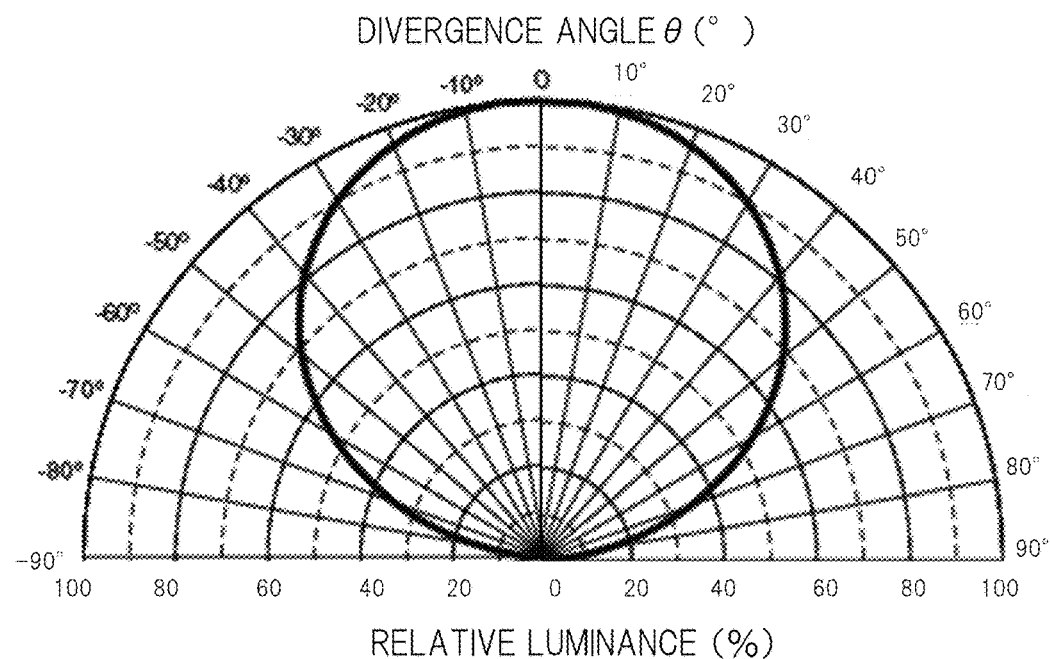
FIG. 22 is a characteristic diagram relatively divergence intensity illustrating radiant energy according to the first embodiment of the high-luminance LED light source.
Figure 23:
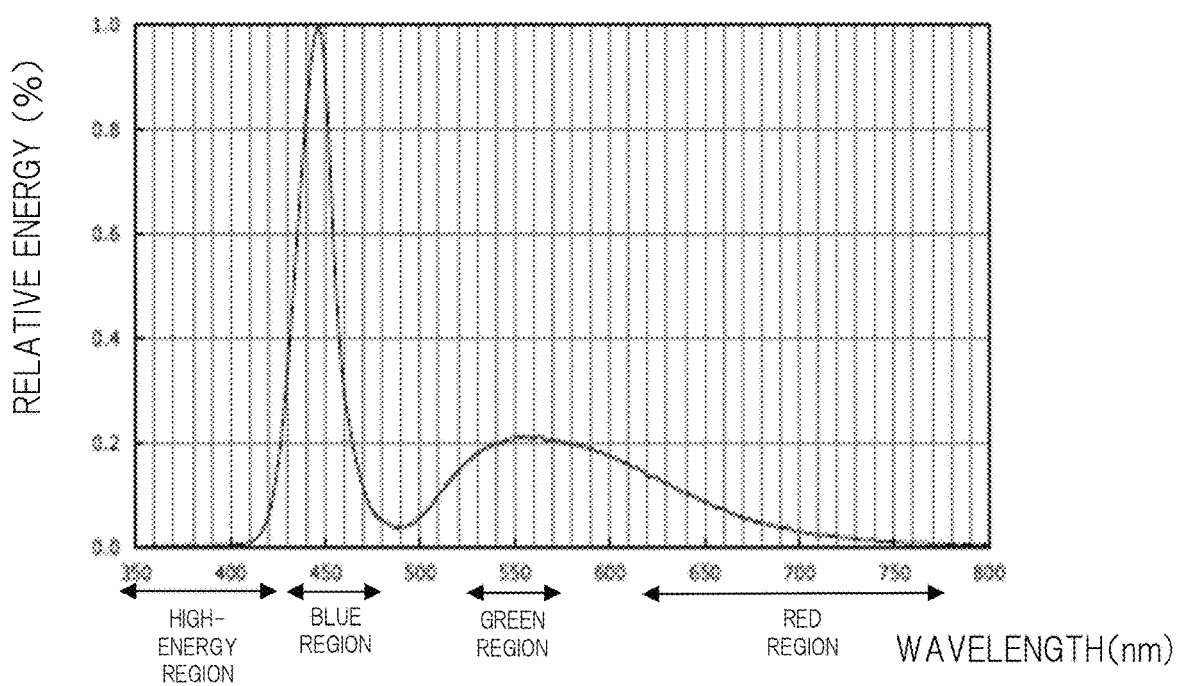
FIG. 23 is a characteristic diagram relatively illustrating radiant energy intensity for each wavelength according to a second embodiment of the high-luminance LED light source.
Figure 24:
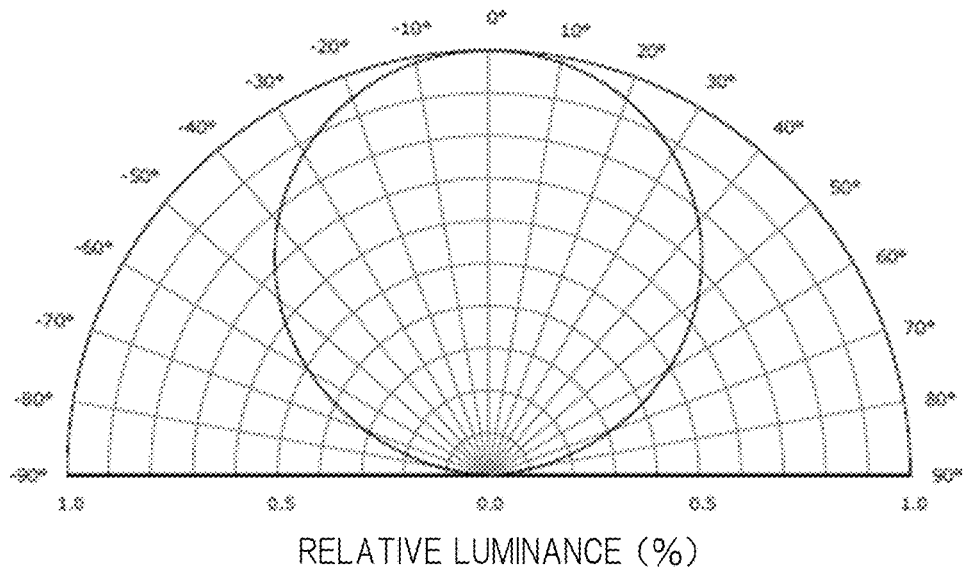
FIG. 24 is a characteristic diagram relatively illustrating radiant energy divergence intensity according to the second embodiment of the high-luminance LED light source.
Figure 26:
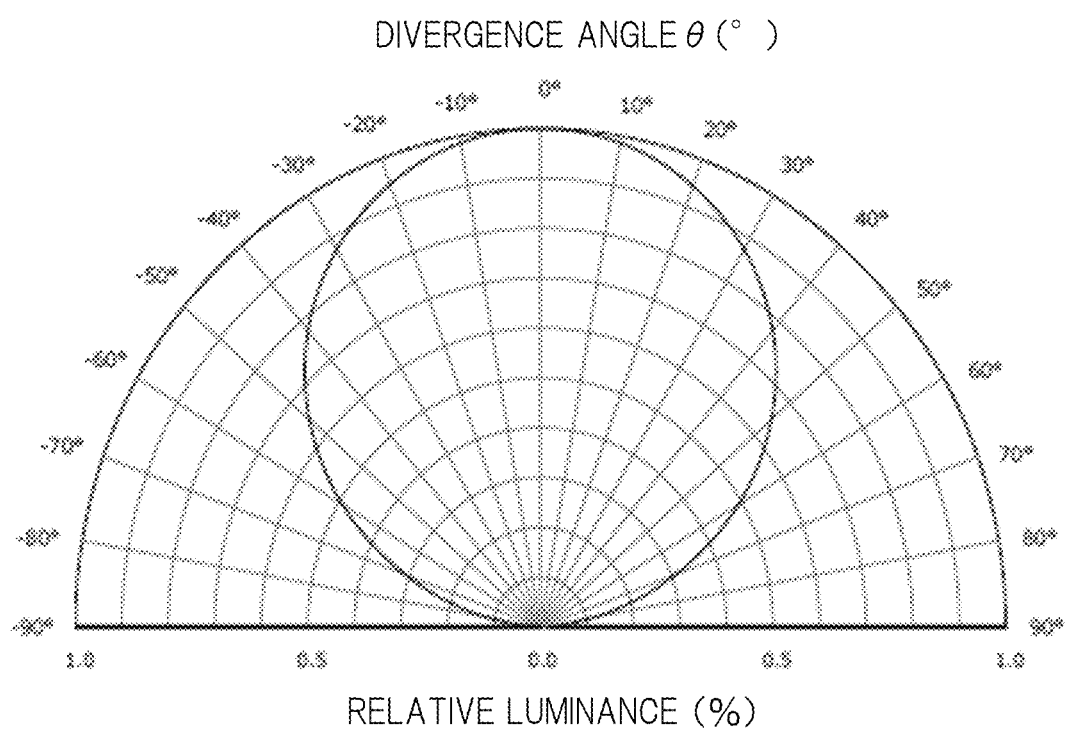
FIG. 26 is a characteristic diagram relatively illustrating radiant energy divergence intensity of an LED light source for an LCD-TV application.

However, the divergence characteristics of the light source light from the LED are as illustrated in FIGS. 22, 24, and 26. In FIGS. 22, 24, and 26, relative luminance is illustrated with a direction perpendicular to an emission surface of the LED (divergence angle of 0 degrees) as 100%. At a divergence angle of 40 degrees, the relative luminance is 80%, and at a divergence angle of 60 degrees, the relative luminance is 55% to 50%, and when the LED described above is used as is, the light source light is obliquely incident on the filter installation surface described above. As a result, the cutoff wavelength is shifted to the short-wavelength side, and affects reliability of the polarizing plate and the LCD panel.

Figure 4:
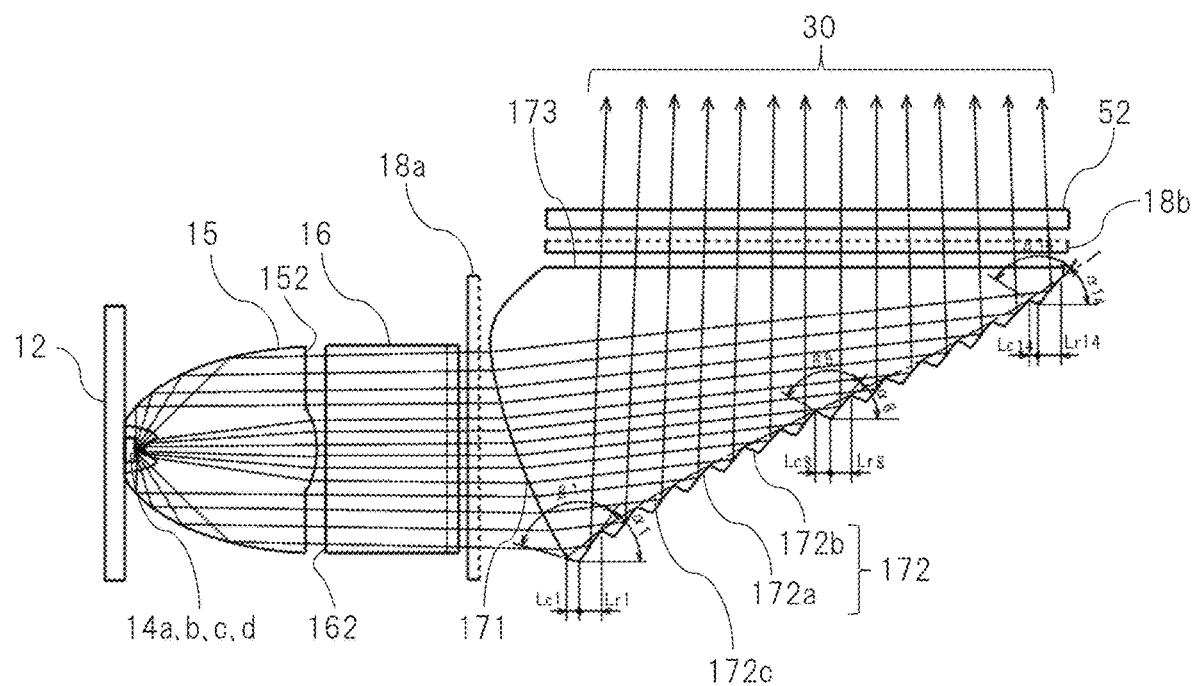
FIG. 4 is a side view describing details of an operation of the light guide in the light source device according to the first embodiment of the present invention.
Figure 5A:
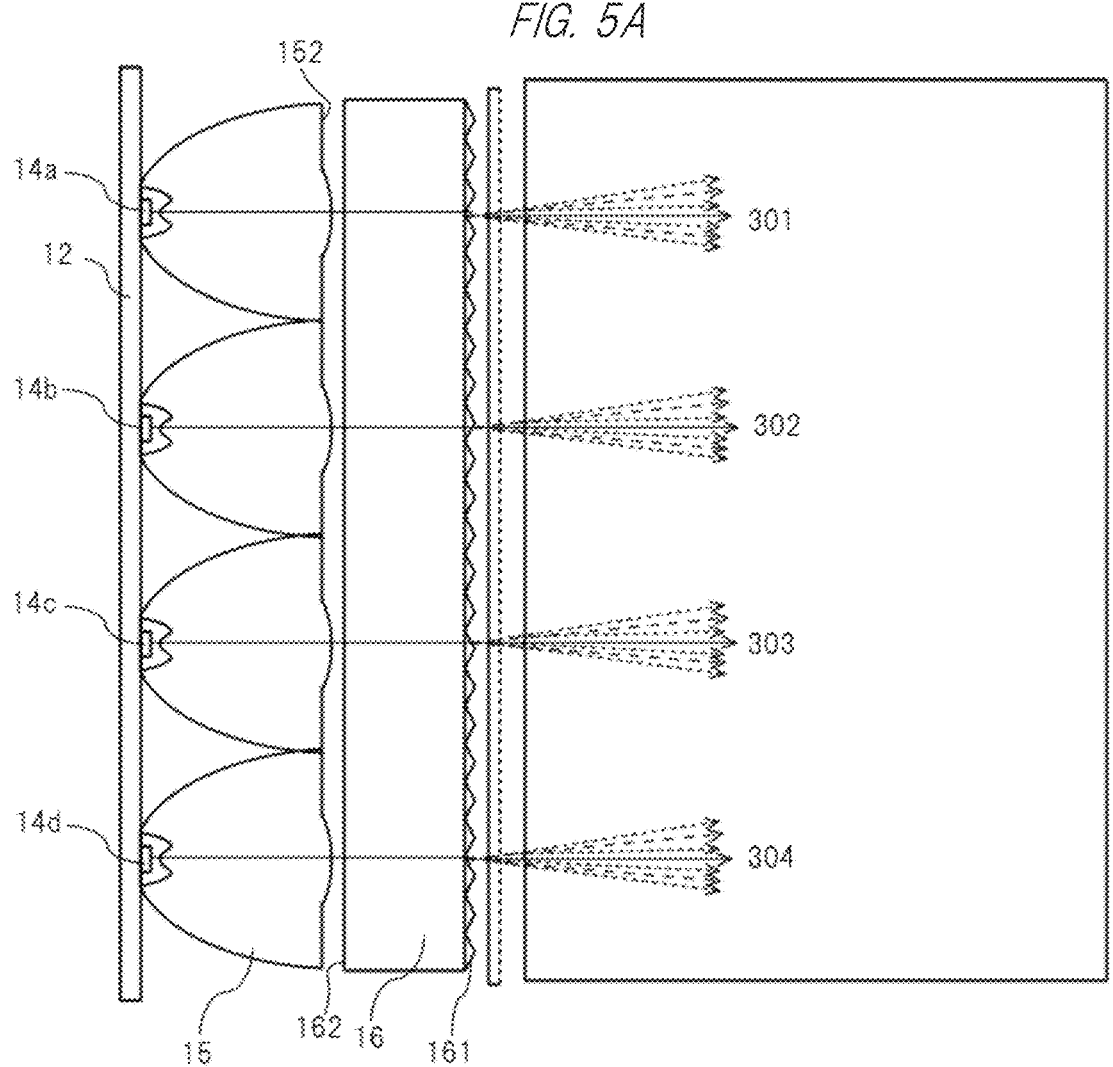
FIG. 5A is a top view describing details of the operation of the light guide in the light source device according to the first embodiment of the present invention.
Figure 5B:
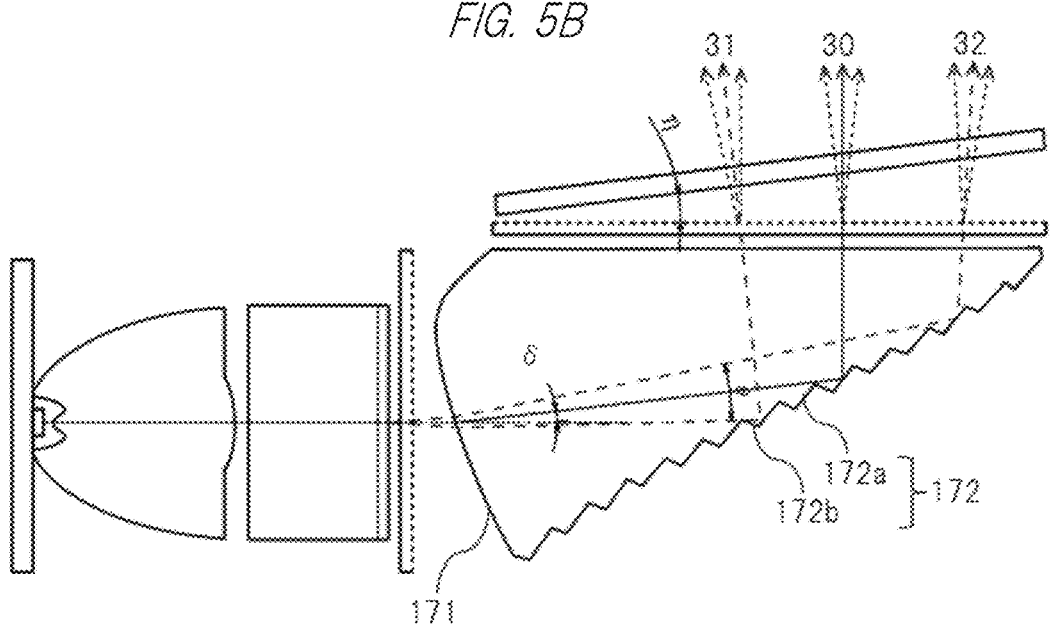
FIG. 5B is a side view describing details of the operation of the light guide in the light source device according to the first embodiment of the present invention.

As a countermeasure against the above, in the present embodiment, as illustrated in FIGS. 4, 5A, and 5B, divergent light from the LED is converted into substantially parallel light by the LED collimator 15, and then the filter FIL having the characteristics illustrated in FIG. 27 is provided on an emission surface 152 of the LED collimator 15 or an incidence surface 162 of the synthetic diffusion block 16, or on both of these surfaces. Thus, the high-energy, short-wavelength blue light and ultraviolet light can be cut off, and the resistance to the high-luminance light source light can be improved.

Figure 16:
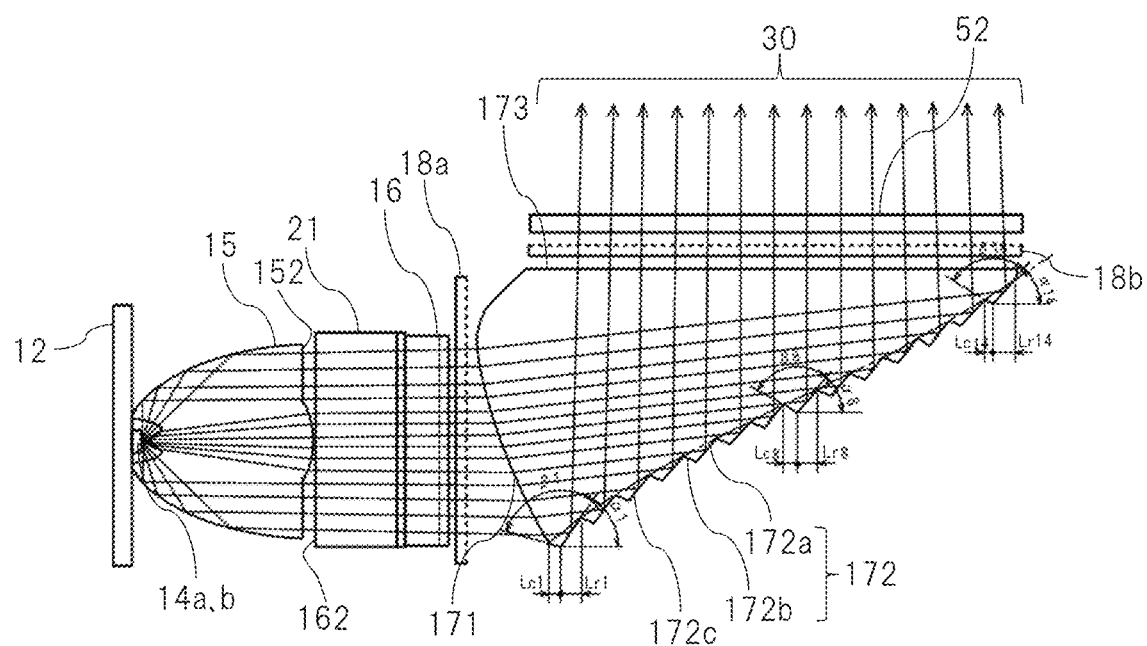
FIG. 16 is a side view illustrating an operation in the optical system of the light source device according to the second embodiment of the present invention.
Figure 17A:
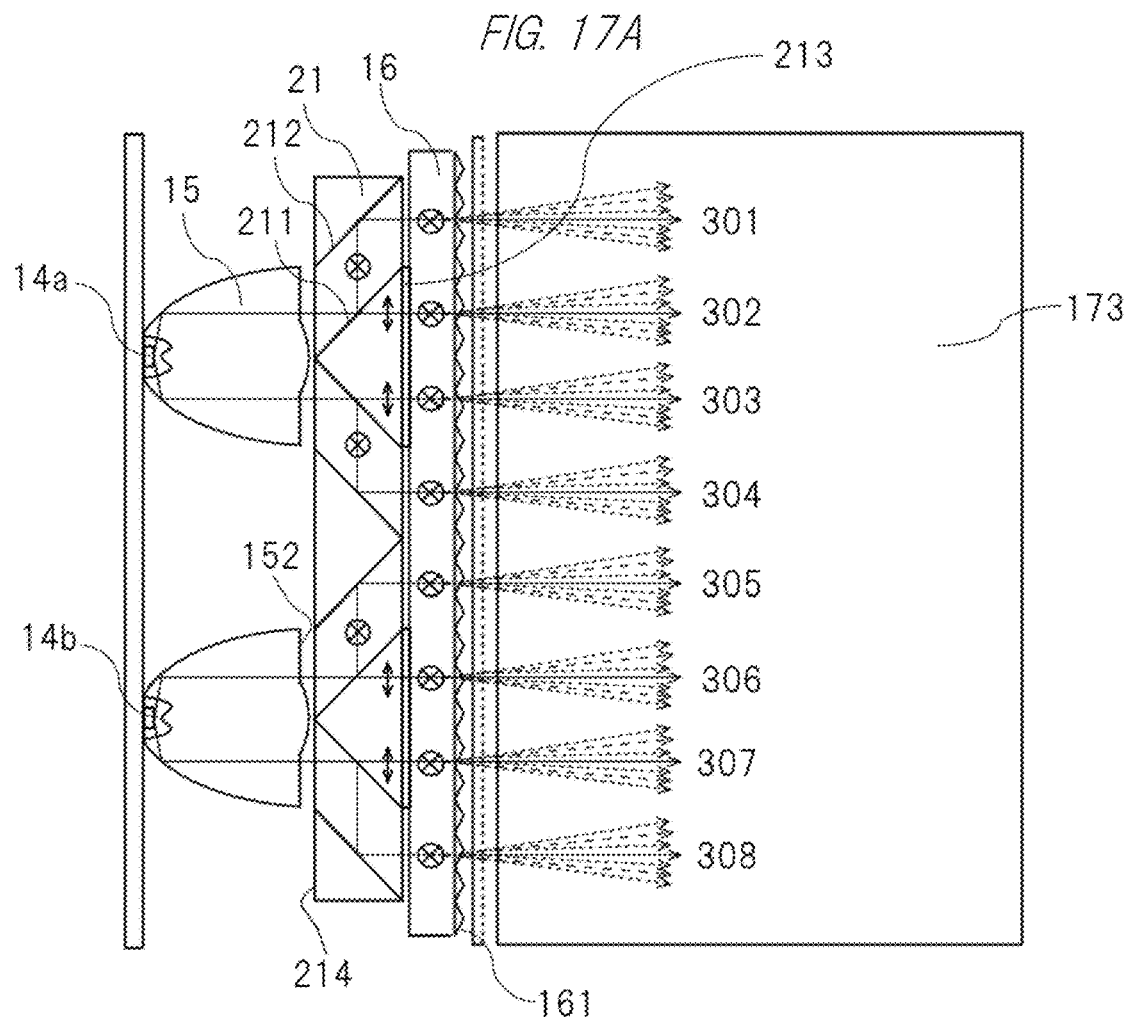
FIG. 17A is a top view describing details of an operation of a light guide in the light source device according to the second embodiment of the present invention.
Figure 17B:
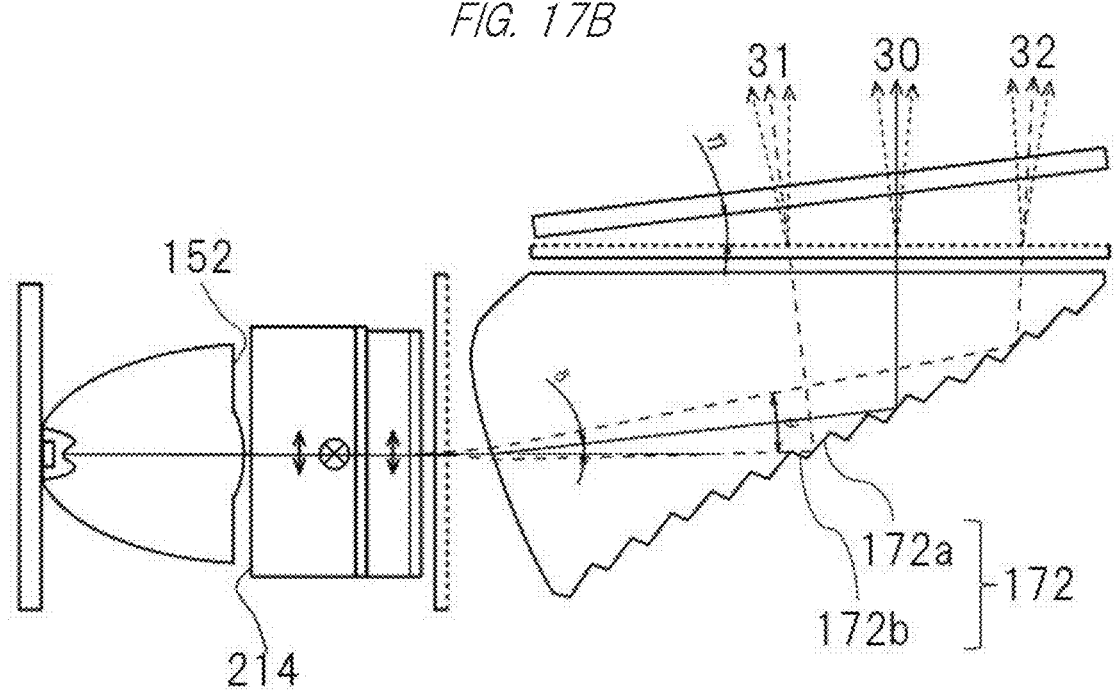
FIG. 17B is a side view describing details of the operation of the light guide in the light source device according to the second embodiment of the present invention.

In a second embodiment to be described below, as illustrated in FIGS. 16, 17A, and 17B, the divergent light from the LED is converted into substantially parallel light by the LED collimator 15, and then the filter having the characteristics illustrated in FIG. 27 is provided on the emission surface 152, or an incidence surface 214 of a polarization conversion element 21, or on both of these surfaces. Thus, as in the first embodiment, the high-energy, short-wavelength blue light and ultraviolet light can be cut off, and resistance to the high-luminance light source light can be significantly improved.

By providing the filter having the characteristic A illustrated in FIG. 27 on the emission surface 152 of the LED collimator, light (e.g., blue light) in the high-energy region reflected by the filter having the characteristic A excites the phosphor of the high-luminance LED again, so that light output is increased. When the filter characteristic A illustrated in FIG. 27 is used as a reference (cutoff wavelength of 435 nm), the light output is improved by about 15%. When the cutoff wavelength of 430 (nm) is used, the light output is improved by 12%, and when the cutoff wavelength of 420 (nm) is used, the light output is improved by 4%, whereby the light output improvement effect can be confirmed.

Detailed Structure of Light Guide

Figure 3A:
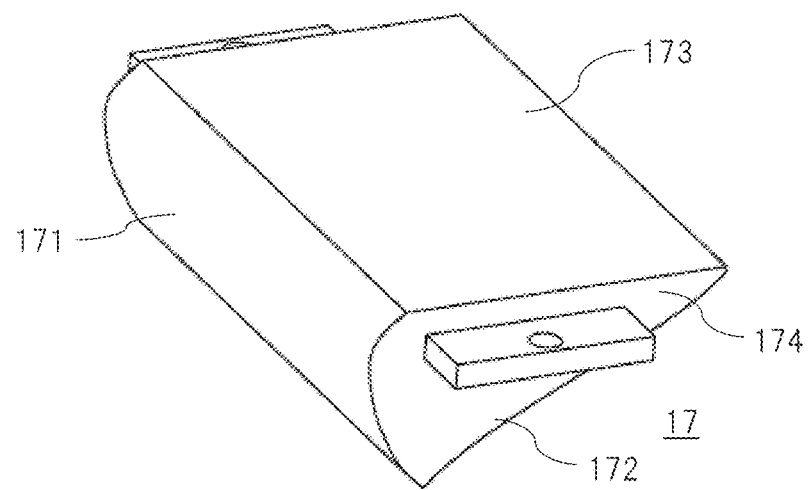
FIG. 3A is a diagram for explaining details of a light guide in the light source device according to the first embodiment of the present invention.

Details of the light guide 17 constituting the light source device 10 described above will now be described with reference to the drawings. Note that FIG. 3A is a perspective view illustrating the entire light guide 17, the upper part of FIG. 3B includes a cross-sectional view of the light guide, and the lower part of FIG. 3B includes partially enlarged cross-sectional views illustrating the details of the cross sections of the light guide.

The light guide 17 is, for example, a rod-shaped member having a substantially triangular cross section (see FIG. 3B) and made of a translucent resin such as acrylic. As illustrated in FIG. 3A, the light guide 17 includes a light guide light incidence portion (surface) 171 configured to face the emission surface of the synthetic diffusion block 16 described above with the first diffusion plate 18a interposed therebetween, a light guide light reflection portion (surface) 172 configured to form an inclined surface, and a light guide light emission portion (surface) 173 configured to face the liquid crystal display panel 52 of the liquid crystal display element 50 described above with the second diffusion plate 18b interposed therebetween.

Figure 3B:
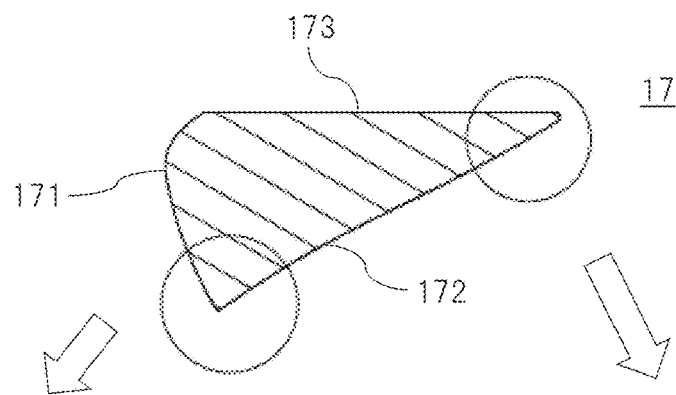
FIG. 3B is a diagram for explaining details of the light guide in the light source device according to the first embodiment of the present invention.
Figure 3B:
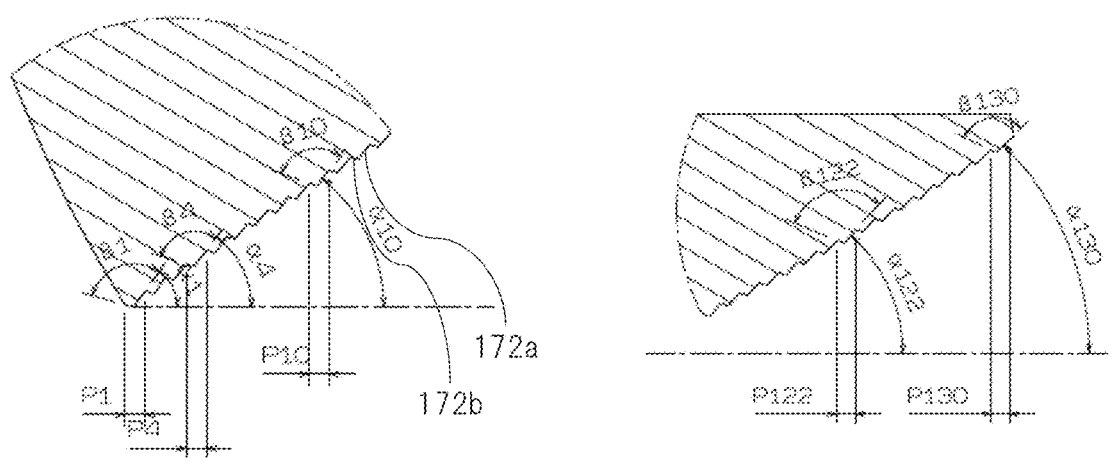

As illustrated in the lower part of FIG. 3B which includes partially enlarged views thereof, a large number of reflection surfaces 172a and connection surfaces 172b are alternately formed in a saw-tooth shape on the light guide light reflection portion (surface) 172 of the light guide 17. Each reflection surface 172a (line segment rising to the right in the drawing) forms an angle $\alpha n$ (n: natural number, e.g., 1 to 130 in this example) with respect to a horizontal plane indicated by the dashed-and-dotted line in the drawing, and $\alpha n$ is here set to 52 degrees or less (but 44 degrees or more) as an example.

On the other hand, each connection surface 172b (line segment falling to the right in the drawing) forms an angle of $\mu n$ (n: natural number, e.g., 1 to 130 in this example) with respect to the reflection surface 172a. In other words, the connection surface 172b of the reflection portion is inclined with respect to incident light at an angle at which a shadow is formed within a range of a half-value angle of a scatterer to be described below. As will also be described in detail below, $\alpha 1$, $\alpha 2$, $\alpha 3$, $\alpha 4$ ... form a reflection surface elevation angle, and $\mu 1$, $\mu 2$, $\mu 3$, $\mu 4$ ... form a relative angle between the reflection surface and the connection surface, and is set to 90 degrees or more (but 180 degrees or less) as an example. Note that, in this example, $\beta 1 = \beta 2 = \beta 3 = \xi 4 = \ldots = \beta 122 = \ldots \mu 130$.

FIGS. 4, 5A, and 5B illustrate, for explanatory purposes, schematic diagrams in which the reflection surface 172a and the connection surface 172b are made relatively larger than the light guide 17. At the light guide incidence portion (surface) 171 of the light guide 17, the main light beam is deflected by $\delta$ in a direction in which the incidence angle with respect to the reflection surface 172a increases (see FIG. 5B). In other words, the light guide incidence portion (surface) 171 is formed in a curved convex shape inclined toward the light source side. According to this, the parallel light from the emission surface of the synthetic diffusion block 16 is diffused through the first diffusion plate 18a to be incident, and as is also apparent from the drawing, the incident light reaches the light guide light reflection portion (surface) 172 while being slightly bent (deflected) upward by the light guide incidence portion (surface) 171 (see comparative example of FIG. 6).

Note that a large number of reflection surfaces 172a and connection surfaces 172b are alternately formed in a saw-tooth shape on the light guide light reflection portion (surface) 172, and the diffused light is totally reflected on each reflection surface 172a and directed upward, and further is incident on the liquid crystal display panel 52 as a parallel diffused light via the light guide light emission portion (surface) 173 and the second diffusion plate 18b. Therefore, the reflection surface elevation angles $\alpha 1$, $\alpha 2$, $\alpha 3$, $\alpha 4$ ... are set such that each reflection surface 172a has an angle larger than or equal to a critical angle with respect to the above-described diffused light, and on the other hand, the relative angles $\beta 1$, $\beta 2$, $\beta 3$, $\beta 4$ ... between the reflection surface 172a and the connection surface 172b are set to a certain angle as described above, and more preferably are set to an angle of 90 degrees or more ($\beta n \geq 90°$), the reason for which will also be described below.

Figure 6:
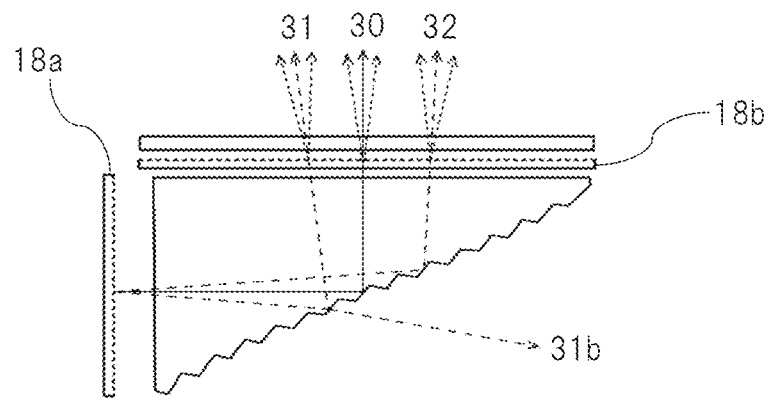
FIG. 6 is a diagram illustrating a comparative example for explaining the operation of the light guide in the light source device according to the first embodiment of the present invention.

According to the above-described configuration, since each of the reflection surfaces 172a is always formed at an angle larger than or equal to the critical angle with respect to the diffused light, total reflection is possible even if a reflective film made of metal or the like is not formed on the reflection portion 172, and thus, a low-cost light source device can be realized. On the other hand, as illustrated in FIG. 6 as a comparative example, when the main light beam is not bent (polarized) at the light guide incidence portion of the light guide 17, a part 31b of the diffused light becomes less than or equal to the critical angle with respect to the reflection surface 172a, making it impossible to secure a sufficient reflectance and to realize light source device having good (bright) characteristics.

The reflection surface elevation angles $\alpha 1$, $\alpha 2$, $\alpha 3$, $\alpha 4$ ... slightly increase from the lower portion to the upper portion of the light guide light reflection portion (surface) 172. Since the light transmitted through the liquid crystal display panel 52 of the liquid crystal display element 50 has a certain degree of divergence angle, in order to prevent the so-called peripheral darkening in which a part of the light transmitted through the peripheral portion of the liquid crystal display panel 52 is blocked by a peripheral edge of a mirror disposed on a downstream side, a configuration is realized such that a peripheral light beam is slightly deflected toward a central axis, as indicated by a light beam 30 in FIG. 4.

Figure 9:
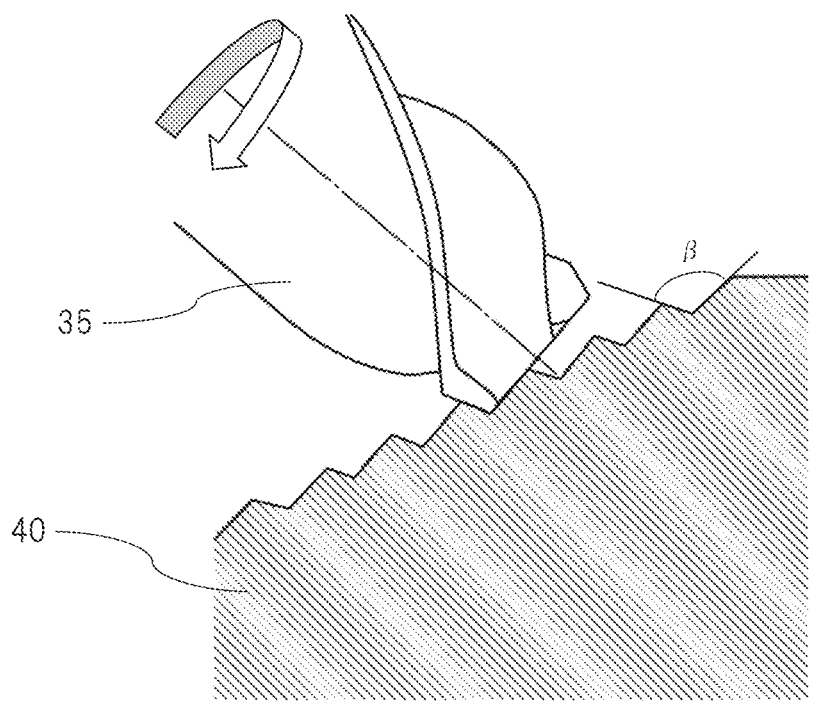
FIG. 9 is a diagram describing a method of machining a mold used for molding a light guide which is a component of the optical system of the light source device according to the first embodiment of the present invention.

As described above, $\beta 1 = \beta 2 = \beta 3 = \beta 4 \ldots \beta n \geq 90°$. This is because, as illustrated in FIG. 9, the reflection surface 172a and the connection surface 172b can be simultaneously machined by an endmill 35 having a relative angle $\beta$ between the bottom surface and the side surface in the machining of a mold 40 for manufacturing the light guide 17 by injection-molding. Since the reflection surface 172a and the connection surface 172b can be machined by relatively thick tools, the machining time can be greatly shortened and the machining cost can be greatly reduced. In addition, a boundary edge between the reflection surface 172a and the connection surface 172b can be machined accurately, and light guiding characteristics of the light guide 17 can be improved.

In addition, in FIG. 4, Lr1, Lr2, Lr3, Lr4 ... represent projected lengths of the reflection surface 172a with respect to the horizontal plane, Lc1, Lc2, Lc3, Lc4 ... represent projected lengths of the connection surface 172b with respect to the horizontal plane, and Lr/Lc, or the ratio between the reflection surface 172a and the connection surface 172b, can be changed depending on the location. The intensity distribution of the main light beam 30 incident on the light guide 17 does not necessarily coincide with the intensity distribution desired on the incidence surface of the liquid crystal display panel. Therefore, a configuration is adopted in which the intensity distribution is adjusted by the ratio Lr/Lc between the reflection surface 172a and the connection surface 172b. Note that, as this ratio is increased, an average intensity of the reflected light at the portion of the surfaces can be increased. In general, since the light beam 30 incident on the light guide tends to be strong at a center portion, the ratio Lr/Lc is set to be different depending on the location in order to correct the light beam, and in particular, the ratio Lr/Lc is set to be small at the center portion. Since the above-described ratio Lr/Lc and the above-described reflection surface elevation angles $\alpha 1$, $\alpha 2$, $\alpha 3$, $\alpha 4$ ... are depending on the location, an envelope 172c representing a general shape of the reflection portion 172 has a curved shape as illustrated in FIG. 4.

Further, Lr1+Lc1=Lr2+Lc2=Lr3+Lc3=Lr4+Lc4 ... =Lr+Lc≤0.6 mm. By adopting such a configuration, it is possible to make the repetition pitches of the reflection surfaces viewed from a light emission surface 173 of the light guide 17 the same. Since the pitch is 0.6 mm or less, in combination with the action and effect of the diffusion plates 18a and 18b, when viewed through the liquid crystal display panel 52, the individual emission surfaces are not separated and are viewed as a continuous surface, so that the spatial luminance through the liquid crystal display panel 52 can be made uniform, thereby improving the display characteristics. In other words, with the present configuration, the intensity distribution of incident light on the liquid crystal display panel 52 can be made uniform. On the other hand, if the value of Lr+Lc is smaller than 0.2 mm, not only a long machining time is required, but also it becomes difficult to accurately machine each reflection surface 172a, so that the value is desirably 0.2 mm or more.

Further, although not illustrated, the value of Lr+Lc described above (sum of the lengths) may be, in whole or in part, a configuration such that Lr1+Lc1>Lr2+Lc2>Lr3+Lc3>Lr4+Lc4 . . . , Lr1+Lc1=Lr2+Lc2=Lr3+Lc3=Lr4+Lc4 . . . =Lr90+Lc90>Lr91+Lc91=Lr92+Lc92>Lr93+Lc93 . . . >Lr130+Lc130, or Lr1+Lc1≥Lr2+Lc2≥Lr3+Lc3≥Lr4+Lc4 . . . Lr1+Lc1>Lr130+Lc130. By adopting such a configuration, the repetition pitch of the reflection surface 172a viewed from the emission surface 173 of the light guide 17 becomes finer as the repetition pitch approaches the emission surface 173. Thus, with the present configuration, the repetition pitch of the reflection surface 172a of the light guide 17 as viewed from the diffusion plate 18b becomes finer as the repetition pitch approaches the diffusion plate 18b. The repetitive structure of the reflection surface 172a requires a certain degree of diffuseness of the diffusion plate 18b because the visibility increases toward the diffusion plate 18b and the uniformity of the light intensity is impaired, but by adopting the present configuration, the repetitive pitch of the reflection surface disposed at a position close to the diffusion plate 18b becomes finer, so that the uniformity of the light intensity can be secured even if the diffuseness of the scattering plate is small, and thus the light utilization efficiency can be improved. Further, the value of Lr+Lc is desirably set within the range of 0.2 mm or more and 0.6 mm or less as described above.

According to the shape of the light guide light reflection portion (surface) 172 of the light guide 17 described above, the total reflection condition of the main light can be satisfied, a reflection film such as aluminum on the reflection portion 172 need not be provided, light can be reflected efficiently, an operation such as a vapor deposition operation of an aluminum thin film which causes an increase in manufacturing cost need not be performed, and a bright light source can be realized at lower cost. Each relative angle β is set to an angle at which the connection surface 172b is shaded with respect to the light in which the main light beam 30 is diffused by the synthetic diffusion block 16 and the diffusion plate 18a. Thus, by suppressing the incidence of unnecessary light on the connection surface 172b, it is possible to reduce the reflection of unnecessary light, and it is possible to realize a light source device having favorable characteristics.

In general, it is desirable that the inclination of the main light beam incident on the liquid crystal display panel is close to vertical. However, depending on the characteristics of the liquid crystal display panel, as illustrated in FIG. 5B, the main light beam can also be inclined by an angle η. In other words, some commercially available liquid crystal display panels have better characteristics when the incidence angle is inclined by about 5° to 10°, but in this case, it is desirable to set η described above to 5° to 10° according to the characteristics.

Instead of inclining the panel by η, it is also possible to incline the inclination of the main light beam to the liquid crystal display panel by adjusting the angle of the reflection surface 172a. Further, if it is necessary to incline the light beam in a side surface direction of the light guide, it can be realized by making the inclination of the slopes of triangular textures 161 formed on the emission surface of the synthetic diffusion block 16 asymmetric, or by changing a formation direction of the textures formed by the reflection surfaces 172a and 172b.

Figure 7:
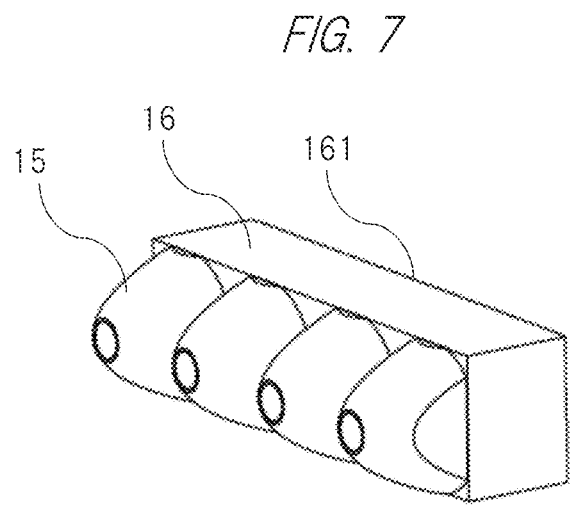
FIG. 7 is a perspective view describing details of a collimator and a synthetic diffusion block in the light source device according to the first embodiment of the present invention.

The synthetic diffusion block 16, which is another component of the light source device 10, will now be described with reference to FIGS. 7 and 8. Note that FIG. 7 illustrates the synthetic diffusion block 16 integrated with the LED collimator 15 described above, and FIG. 8 illustrates a partially enlarged cross section of the synthetic diffusion block 16.

Figure 8:
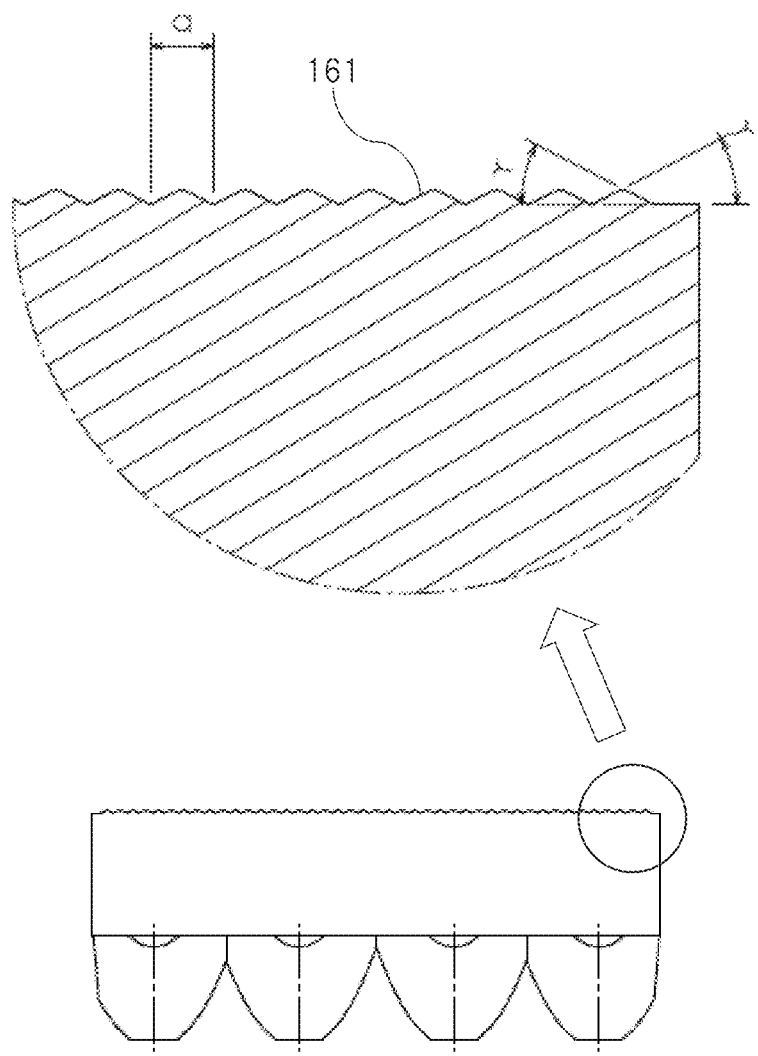
FIG. 8 is a partially enlarged cross-sectional view describing details of the synthetic diffusion block in the light source device according to the first embodiment of the present invention.

As is also apparent from FIG. 8, a large number of textures 161 having a substantially triangular cross section are formed on the emission surface of the synthetic diffusion block 16, and the light emitted from the LED collimator 15 is diffused in a direction vertical to the plane of the drawing of the incidence portion (surface) 171 of the light guide 17 described above by the action of the textures 161. By the interactions between the above-described substantially triangular textures 161 and diffusion plates 18a and 18b, even when the LED collimators 15 are discretely disposed, the individual intensity distribution of the light emitted from the emission portion 173 of the light guide 17 can be made uniform. In particular, since a diffusion direction can be limited to the side surface direction of the light guide, and further, the diffuseness in the side surface direction can be controlled by the textures 161, it is possible to weaken the isotropic diffuseness of the first and second diffusion plates 18a and 18b described above, and as a result, the light utilization efficiency is improved, and it is possible to realize a light source device having good characteristics. Note that, in this example, as an example of the substantially triangular textures 161, the angle γ=30 degrees and the formation pitch a of the textures=0.5 mm.

As described above in detail, according to the light source device 10 of the present invention, the light utilization efficiency of the laser light from the LED light source and the uniform illumination characteristics thereof can be further improved, and the light source device can be miniaturized and manufactured at low cost, so that in particular, it is possible to provide a light source device suitable as an illumination light source in a display device of an electronic device such as an HUD or an ultra-small projector.

Modification Example of Light Source Device

Figure 10:
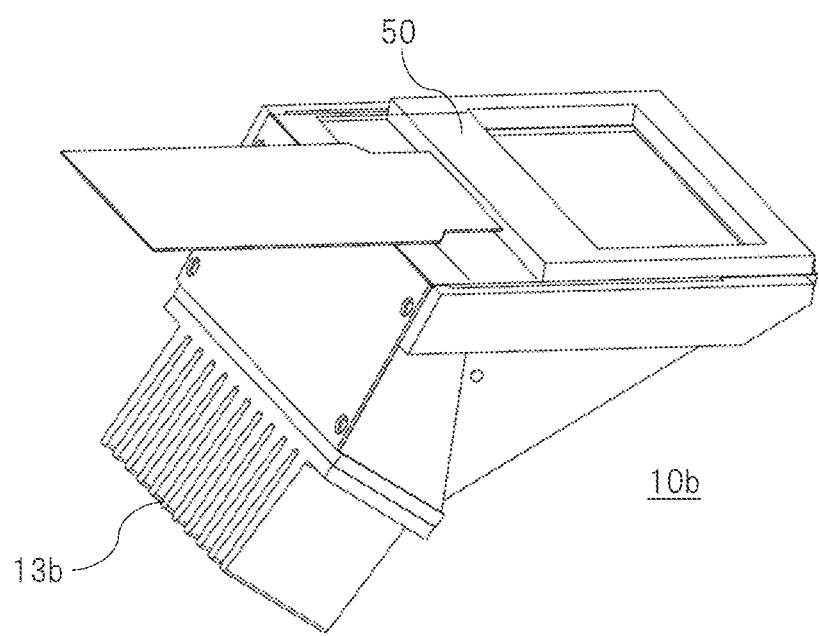
FIG. 10 is an exterior perspective view illustrating an overall overview of a light source device which is a modification example of the light source device according to the first embodiment of the present invention.
Figure 11:
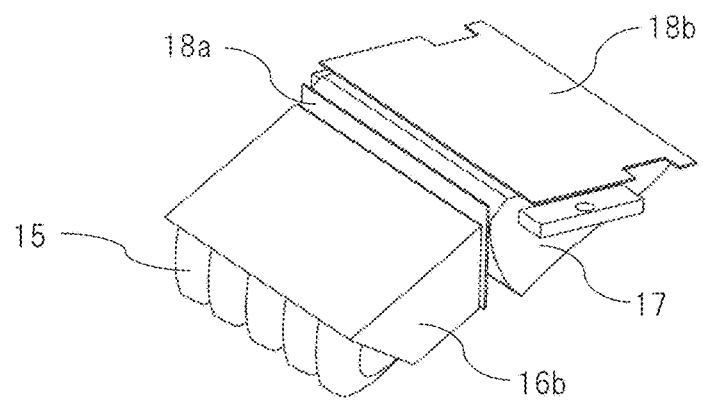
FIG. 11 is a perspective view illustrating an overview of an internal configuration of an optical system of a light source device which is a modification example of the light source device according to the first embodiment of the present invention.

FIGS. 10 and 11 illustrate a modification example of the light source device according to the first embodiment of the present invention, and as the modification example, an exterior perspective view of an entire light source device 10b and the internal configuration of the light source device are illustrated. In this modification example, a plurality of LED collimators 15 each having a conical convex shape to which an LED is attached are attached at an inclined position below the device by using a synthetic diffusion block 16b having a substantially trapezoidal cross section. Note that the reference numeral 13b in the drawing denotes a heatsink for cooling heat that is generated in the LED elements and the control circuit.

Another Modification Example of Light Source Device

Figure 12:
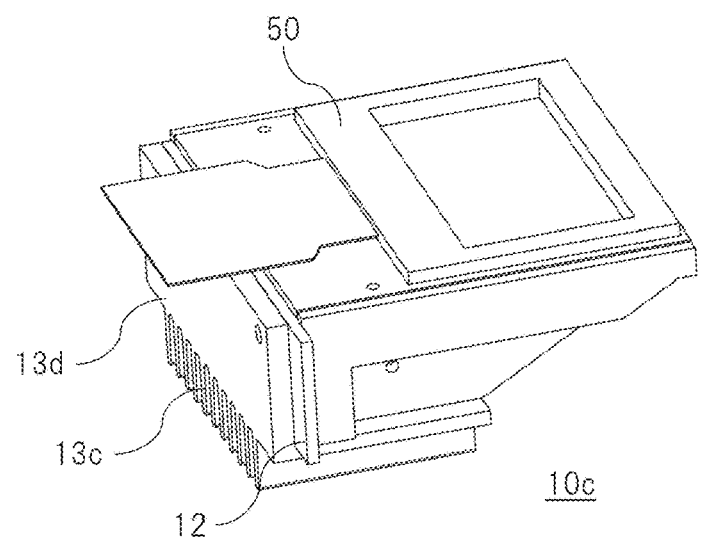
FIG. 12 is an exterior perspective view illustrating an overall overview of a light source device which is another modification example of the light source device according to the first embodiment of the present invention.

Further, FIG. 12 illustrates another modification example of the light source device according to the first embodiment of the present invention, and as another modification example, an exterior perspective view of an entire light source device 10c is illustrated. In this another modification example, although not illustrated in detail, the light source device has a structure in which heat that is generated in an LED substrate 12 is cooled by a heatsink 13c disposed at the lower portion of the device through a heat transfer plate 13d. With the present configuration, a light source device having a short overall length can be realized.

<Another Form of Collimator in Light Source Device>

Figure 13:
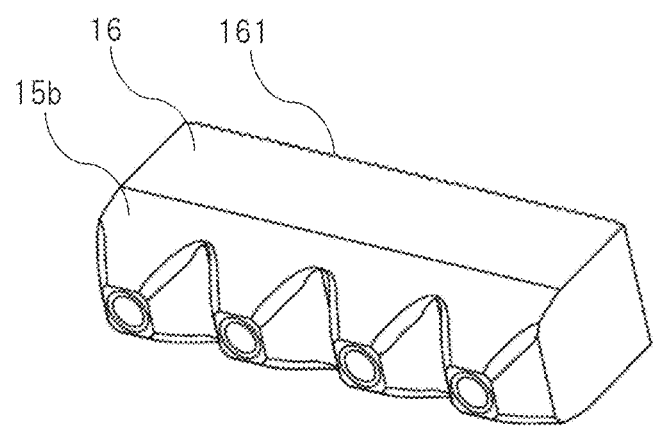
FIG. 13 is a perspective view illustrating another form of the collimator and the shape of the synthetic diffusion block in the light source device according to the first embodiment of the present invention.

Further, FIG. 13 illustrates another form of the collimator 15b in the light source device according to the first embodiment of the present invention, and illustrates an example of a shape in which the above-described synthetic diffusion block 16 is combined. The collimator shapes illustrated in FIGS. 7 and 8 have external shapes having conical convex shapes obtained by rotating a substantially parabolic disconnection line, but the shapes are based on substantially quadrangular pyramid convex shapes corners thereof being chamfered or curved. In view of the efficiency of the light emitted from the LED and emitted from the light guide 17, the paraboloid of revolution shapes illustrated in FIGS. and 8 are suitable, but the present configuration can realize a more uniform light intensity distribution because the boundaries of the substantially quadrangular pyramid convex shapes are smoothly connected.

Note that the light source devices 10b and 10c, which are modification examples of the light source device of the present invention described above, also have the same action and effect as the light source device 10 illustrated in FIG. 1 described above. Note that, by appropriately selecting these light source devices 10, 10b, and 10c, it is possible to reliably attach the light sources to electronic devices such as an HUD and ultra-small projector having various shapes and forms so as to be adapted to the internal storage spaces of the electronic devices.

Application Example of Light Source Device

In addition, an example in which the above-described light source device 10 of the present invention is mounted on an HUD and an ultra-small projector will be described below as a representative example of an electronic device using the light source device as a light source of the display device thereof.

Figure 14A:
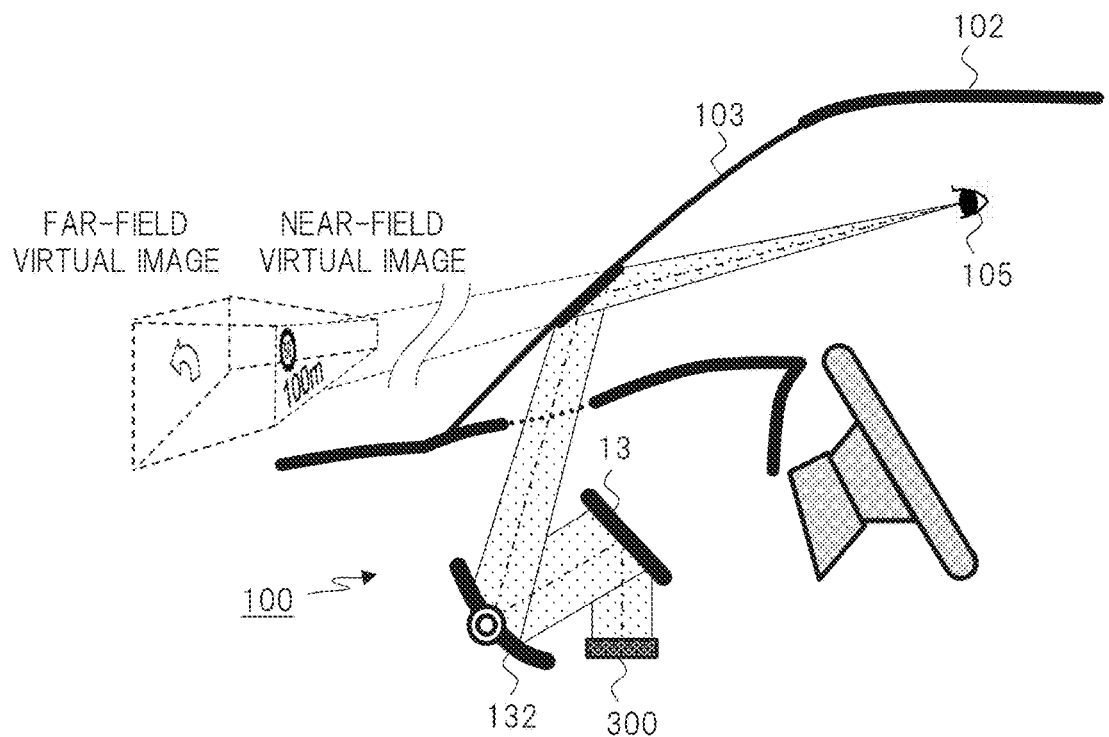
FIG. 14A is a diagram illustrating the configuration of an HUD in which the light source device according to the first embodiment of the present invention is used as an illumination light source of the display device.

FIG. 14A illustrates an example in which the light source device described above according to the first embodiment of the present invention is applied to an HUD. Note that, in this drawing, in a head-up display device 100, an image displayed on an image display device 300 including a projector, a liquid crystal display (LCD), or the like is reflected by a mirror 131 or another mirror 132 (e.g., a free-curved surface mirror or a mirror having an optical axis asymmetric shape), and is projected onto a windshield 3 of a vehicle 2. On the other hand, a driver 105 sees the image projected onto the windshield 103, thereby visually recognizing the image described above as a virtual image in front of the transparent windshield 103 through the transparent windshield.

Figure 14B:
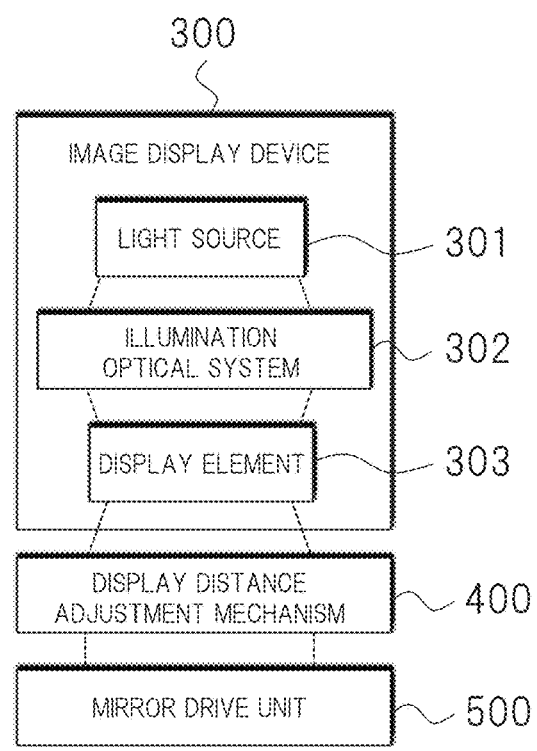
FIG. 14B is a diagram illustrating the configuration of an HUD in which the light source device according to the first embodiment of the present invention is used as an illumination light source of the display device.
Figure 15:
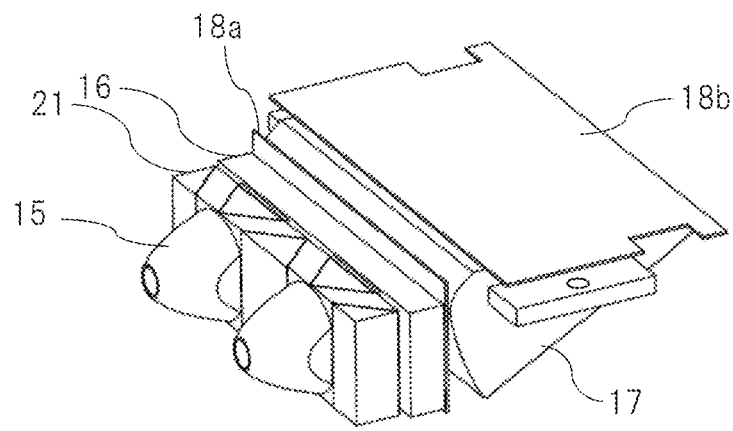
FIG. 15 is a perspective view illustrating an example of a structure of an optical system of a light source device according to a second embodiment of the present invention.

FIG. 14B illustrates an example of the internal configuration of the head-up display device 100 described above, in particular, the image display device 300 thereof. As is also apparent from this drawing, a case where the image display device 300 is a projector is illustrated, and the image display device 300 includes, for example, a light source 301, an illumination optical system 302, and a display element 303. Note that, by adopting the above-described light source device 10 of the present invention as the light source 301, it is possible to generate favorable illumination light for projection.

Note that this example further includes the illumination optical system 302 which is an optical system for condensing illumination light generated by the light source 301, making the illumination light more uniform, and irradiating the display element 303 with the illumination light, and further includes the display element 303 which is an element for generating an image to be projected. However, in the above-described embodiment, these elements are already included in the light source device 10 of the present invention as the synthetic diffusion block 16, the first diffusion plate 18a, the light guide 17, and the second diffusion plate 18b, and further as the liquid crystal display panel 52. Therefore, the light source device 10 of the present invention itself can be used as the image display device 300 of the head-up display device 100. According to this, in particular, it is possible to realize the head-up display device 100 which can be easily attached in a narrow space such as a dashboard in an automobile.

Note that it will be apparent to those skilled in the art that the light emitted from the image display device 300 described above is further projected onto the windshield 103 of a vehicle 102 via a display distance adjustment mechanism 400 and a mirror drive unit 500.

As described above in detail, by using the light source device 10 of the present invention as an illumination light source of a display device, it is possible to realize an electronic device which can be easily attached even in a narrow space and which is more miniaturized and inexpensive.

Second Embodiment

Details of a second example (second embodiment) of the present invention will now be described. Note that, in the second embodiment, unlike the first embodiment described above, attention is paid to the transmittance with respect to the polarized wave of the liquid crystal display panel 52 constituting the liquid crystal display element 50 on which the illumination light from the light source device is incident, and further, a polarization conversion element for aligning a polarization direction of the light emitted from the collimating optical system in one direction is provided, thereby realizing a more miniaturized and highly efficient light source device.

FIGS. 15 to 17B illustrate the configuration of a light source device according to the second embodiment of the present invention, in particular, the configuration of an optical system serving as a feature thereof. In other words, in the second embodiment, in the configuration of the first embodiment described above, the number of LEDs 14a and 14b constituting the light sources is two, which is half that of the first embodiment, and the polarization conversion element 21 is provided between the LED collimator 15 for each of the LEDs and the synthetic diffusion block 16. Note that other configurations in the drawings are the same as those of the first embodiment described above, and are denoted by the same reference numerals, and detailed description thereof will be omitted here to avoid duplication.

As is apparent from these drawings, particularly from FIG. 17A, the polarization conversion element 21 is configured by combining a columnar (hereinafter referred to as a parallelogram column) translucent member having a parallelogram cross section and a columnar (hereinafter referred to as a triangular column) translucent member having a triangular cross section, which extend along a direction perpendicular to the plane of the drawing, and arranging a plurality of combinations of the members in an array parallel to a plane orthogonal to the optical axis of the parallel light from the LED collimator 15 (in this example, the direction vertical to the plane of the drawing). Further, polarizing beam splitter (hereinafter abbreviated as "PBS") films 211 and reflective films 212 are alternately provided at the interface between the adjacent translucent members arranged in an array, and a ½λ phase plate 213 is also provided on the emission surface from which light incident on the polarization conversion element 21 and transmitted through the PBS films 211 is emitted.

As described above, the above-described polarization conversion element 21 is configured symmetrically with respect to the plane (the vertical plane extending vertically on the plane of the drawing) formed by the optical axis of the parallel light from the LED collimator 15 and an extending direction of the translucent member of the parallelogram column, that is, the optical axis plane of the parallel light, and the inclination of the parallelogram column or the triangular column of the translucent member that is a component of the polarization conversion element is 45 degrees with respect to the optical axis plane. The polarization conversion elements 21 constitute each of the polarization conversion elements divided into two groups in the vertical direction of the drawing with respect to the parallel light beams from the two LED collimators 15.

According to the polarization conversion element 21 configured as described above, as illustrated in FIG. 17A, an S-polarized wave (see symbol "×" in the drawing), for example, of incident light emitted from the LED 14a and converted into parallel light by the LED collimator 15 is reflected by the PBS film 211, and then further reflected by the reflective film 212 to reach an incidence surface of the synthetic diffusion block 16. On the other hand, a P-polarized wave (see the up and down arrows in the drawing) is transmitted through the PBS film 211 and then converted into an S-polarized wave by the ½λ phase plate 213 to reach the incidence surface of the synthetic diffusion block 16.

As described above, according to the polarization conversion element 21, all of the light emitted from the (plurality of) LEDs and converted into parallel light by the LED collimator 15 become S-polarized waves and are incident on the incidence surface of the synthetic diffusion block 16. Then, the light emitted from the emission surface of the synthetic diffusion block 16 is made incident on the light guide 17, which is already described above in detail, via the first diffusion plate 18a, and is reflected upward in the drawing by the action of the light guide 17 to be guided to the incidence surface of the above-described liquid crystal display element 50, as in the first embodiment. In other words, the action of the light guide 17 has already been described in detail above, and the description thereof will be omitted here to avoid duplication.

Figure 18:
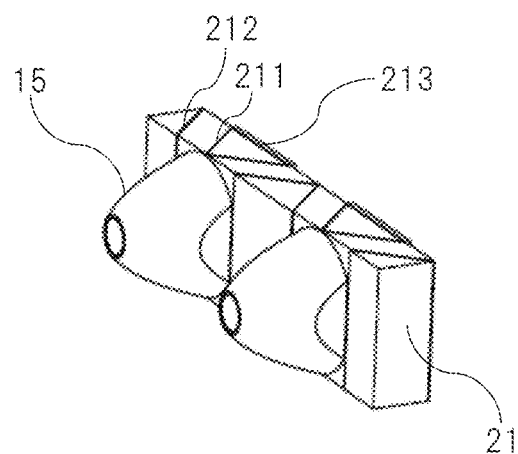
FIG. 18 is a perspective view illustrating an example of a structure of an LED collimator and a synthetic diffusion block which are components of an optical system of the light source device according to the second embodiment of the present invention.
Figure 19:
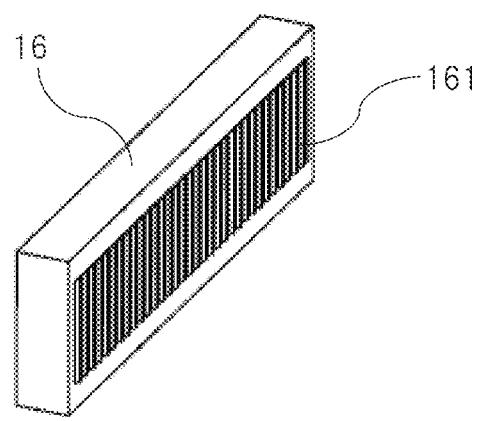
FIG. 19 is a perspective view illustrating an example of the structure of the synthetic diffusion block which is a component of the optical system of the light source device according to the second embodiment of the present invention.
Figure 20:
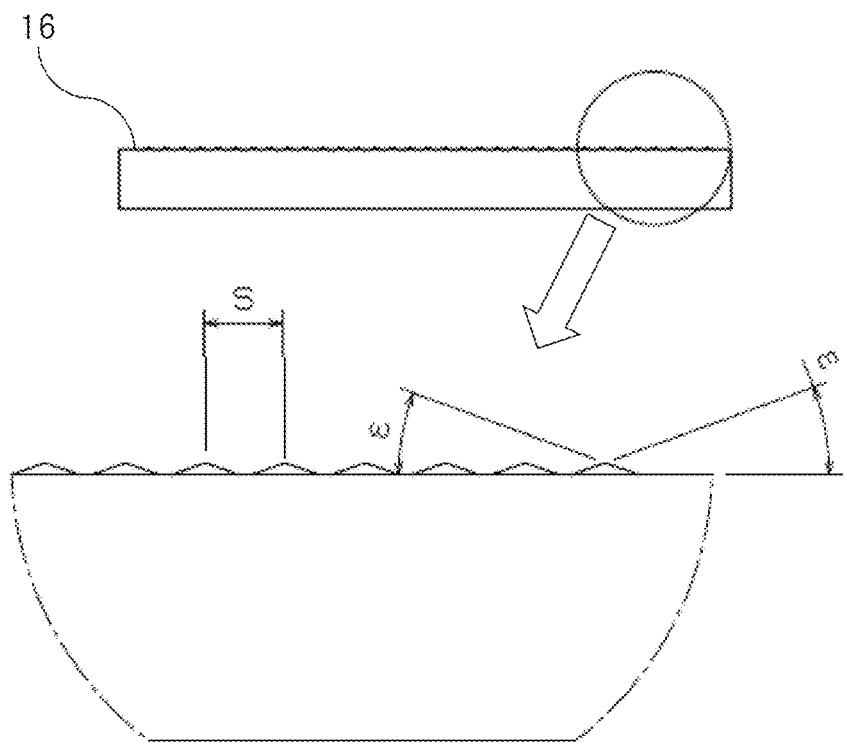
FIG. 20 is a cross-sectional view and partially enlarged cross-sectional views thereof describing details of the synthetic diffusion block in the light source device according to the second embodiment of the present invention.

Note that FIG. 18 is a perspective view illustrating a state in which the two LED collimators 15 described above are attached to the polarization conversion element 21 described above. FIG. 19 is a perspective view illustrating the exterior configuration of the synthetic diffusion block 16 attached to the emission surface side of the polarization conversion element, and FIG. 20 is a side view illustrating the detailed structure of the synthetic diffusion block 16 and a partially enlarged cross-sectional view thereof. As is also apparent from these drawings, also in the second embodiment, a large number of textures 161 having a substantially triangular cross section are formed on the emission surface of the synthetic diffusion block 16. However, the details thereof have already been described above and will be omitted here.

In other words, according to the light source device described above of the second embodiment, since the light incident on the liquid crystal display panel 52 constituting the liquid crystal display element 50 is converted into the S-polarized wave by the polarization conversion element 21 described above, the transmittance of the light in the liquid crystal display panel can be improved, so that a more miniaturized and highly efficient light source device can be realized at a lower cost by a smaller number of light emission sources (LEDs). Note that, although in the above description, the polarization conversion element 21 is attached after the LED collimator 15, the present invention is not limited thereto, and it will be apparent to those skilled in the art that the same action and effect can be obtained by providing the polarization conversion element in the optical path leading to the liquid crystal display element.

Further, although it has been described that the an excellent liquid crystal display panel has transmittance for S-polarized waves, it will be apparent to those skilled in the art that the same action and effect can be obtained by a polarization conversion element having the same configuration as that described above even when the liquid crystal display panel has an excellent transmittance for P-polarized waves. It will be apparent to those skilled in the art that the light source device described above according to the second embodiment can also be used as a light source device in an electronic device such as a head-up display device or a projector, as in the light source device described above according to the first embodiment.

A planar light source device suitable for use in an electronic device including an image display device according to various embodiments of the present invention has been described above. However, the present invention is not limited only to the above-described embodiments, and includes various modification examples. For example, in the above-described embodiments, the entire system has been described in detail in order to explain the present invention in an easy-to-understand manner, and the present invention is not necessarily limited to a system including all the configurations described above. A part of the configuration of a certain embodiment can be replaced with the configuration of another embodiment, and the configuration of another embodiment can be added to the configuration of a certain embodiment. A part of the configuration of each embodiment can be added, deleted, or replaced with another configuration.

REFERENCE SIGNS LIST

10 LIGHT SOURCE DEVICE (MAIN BODY)
11 CASE
50 LIQUID CRYSTAL DISPLAY ELEMENT
12 LED SUBSTRATE
13 HEATSINK
14a, 14b LED
15 LED COLLIMATOR
16 SYNTHETIC DIFFUSION BLOCK
17 LIGHT GUIDE
171 LIGHT GUIDE LIGHT INCIDENCE PORTION (SURFACE)
172 LIGHT GUIDE LIGHT REFLECTION PORTION (SURFACE)
172a REFLECTION SURFACE
172b CONNECTION SURFACE

173 LIGHT GUIDE LIGHT EMISSION PORTION (SURFACE)
21 POLARIZATION CONVERSION ELEMENT
211 PBS FILM
212 REFLECTIVE FILM
213 ½λ PHASE PLATE

The invention claimed is:

1. A head-up display device comprising:
   a display element configured to display an image;
   a light source device configured to irradiate light to the display element; and
   an optical system configured to display a virtual image based on light from the display element,
   the light source device comprising:
   a light source configured to generate white light by irradiating a phosphor with light emitted from a solid-state light source;
   a collimating optical system configured to convert a divergent light flux of the white light emitted from the light source into parallel light;
   a light guide configured to cause the light emitted from the collimating optical system to be incident as incident light and emit the incident light in a direction different from an incident direction; and
   a filter configured to reflect light in a blue region of the parallel light to irradiate the phosphor.

2. The head-up display device according to claim 1, wherein the filter is provided on an emission surface of the collimating optical system.

3. The head-up display device according to claim 1, comprising
   a diffusion block between the collimating optical system and the light guide and configured to diffuse the parallel light,
   wherein the filter is provided on an incidence surface of the diffusion block.

4. The head-up display device according to claim 3, wherein the filter is provided on each of an emission surface of the collimating optical system and the incidence surface of the diffusion block.

5. The head-up display device according to claim 1, wherein a divergence angle of a light source emitted from a light source that generates white light by irradiating a phosphor with light emitted from the solid-state light source is 80 degrees or more.

6. The head-up display device according to claim 1, wherein the filter has a cutoff wavelength of 435 (nm) or less at which a reflectance is 50%.

7. The head-up display device according to claim 1, comprising
   a polarization conversion element between the collimating optical system and the light guide and configured to align a polarization direction of light in one direction.

8. The head-up display device according to claim 1, wherein the light guide includes an incidence portion on which the incident light is incident, a reflection portion which reflects the incident light, and an emission portion which emits light reflected by the reflection portion, and
   wherein the reflection portion includes a plurality of reflection surfaces that reflect the incident light and a plurality of connection surfaces that connect the plurality of reflection surfaces, and the incidence portion has a structure that deflects light in a direction in which an incidence angle of the incident light that is incident on the reflection surface of the reflection portion becomes larger.

9. The head-up display device according to claim 8, comprising
   a scatterer between the collimating optical system and the light guide,
   wherein the connection surface is inclined with respect to the incident light at an angle at which a shadow is formed within a range of a half-value angle of the scatterer.

10. The head-up display device according to claim 8, wherein the incidence surface is an inclined surface disposed obliquely with respect to the incident light.

11. The head-up display device according to claim 10, wherein at least a part of the incidence surface is a curved surface.

12. The head-up display device according to claim 9, wherein an elevation angle of the reflection surface varies depending on a location, and a relative angle between the reflection surface and the connection surface adjacent to each other is 90 degrees or more.

13. The head-up display device according to claim 12, wherein the relative angle is a constant value regardless of location.

14. The head-up display device according to claim 8, wherein a structure that diffuses light is formed on an emission surface of the collimating optical system.

* * * * *